United States Patent [19]

Enari et al.

[11] Patent Number: 4,831,243
[45] Date of Patent: May 16, 1989

[54] INFORMATION MEMORY APPARATUS FOR READING OUT INFORMATION FROM A MOVING RECORDING MEDIUM

[75] Inventors: Masahiko Enari, Yokohama; Hiroshi Matsuoka, Kawasaki; Akio Aoki, Tokyo; Kazuo Minoura, Yokohama, all of Japan

[73] Assignee: Canon Kabushiki Kaisha, Tokyo, Japan

[21] Appl. No.: 936,599

[22] Filed: Dec. 1, 1986

[30] Foreign Application Priority Data

Dec. 4, 1985 [JP] Japan .................................. 60-272802
Dec. 4, 1985 [JP] Japan .................................. 60-272803
Dec. 4, 1985 [JP] Japan .................................. 60-272804

[51] Int. Cl.⁴ .............................................. G06K 7/00
[52] U.S. Cl. ..................................... 235/436; 235/477; 235/480; 235/456
[58] Field of Search ............... 235/476, 477, 480, 436; 369/124, 174; 360/2

[56] References Cited

U.S. PATENT DOCUMENTS

3,946,202  3/1976  Taniguchi et al. ............. 235/477 X
4,056,849  11/1977  Bevis ................................ 235/477 X
4,074,853  2/1978  Flint ..................................... 235/477

Primary Examiner—David L. Trafton
Attorney, Agent, or Firm—Fitzpatrick, Cella, Harper & Scinto

[57] ABSTRACT

An information memory apparatus includes: an endless belt which is driven forward and in reverse by a motor and reciprocates a recording medium such as an optical card; an optical head for reading out information from the recording medium which is being moved by the endless belt; a memory for temporarily storing the information read out by the optical head; a transfer apparatus for transferring the information read out of the memory to the outside; and a control circuit for changing the positions at which the information stored in the memory is read in accordance with the reading of the information upon the forward and returning operation of the recording medium. The control circuit also changes the reading directions of the information from the memory in accordance with the forward and returning operations of the recording medium. With this apparatus, the information reading efficiency is improved and the information is efficiently transferred by a simple constitution, while reducing the number of memories.

25 Claims, 7 Drawing Sheets

INFORMATION MEMORY APPARATUS FOR READING OUT INFORMATION FROM A MOVING RECORDING MEDIUM

BACKGROUND OF THE INVENTION

1. Field of the Invention

The present invention relates to an information memory apparatus.

2. Related Background Art

In recent years, small-sized portable card-shaped recording media have been developed. To improve the reading efficiency of information in apparatus using such a recording medium, a method has been developed whereby the information is reproduced upon both forward and returning operations. However, to reproduce the information in both directions, there is the problem that the processes to transfer the information become complicated.

In addition, in the case where the information is reproduced by reciprocating the card-shaped recording medium and the reproduced information is transferred to the host computer and the like, the information is read out and stored in the memory, while the information is read out of the memory and transferred. However. there are the drawbacks such as the necessity of using a plurality of memories also, during the transfer of the information, the host computer side cannot perform the other processes.

On the other hand, in the case where the card-shaped recording medium is reciprocated and the information to be recorded is transferred from the host computer and the like to the memory apparatus and recorded therein, the information is transferred and stored in the memory, while the information is read out of the memory and recorded in the recording medium. However, there are the drawbacks that a plurality of memories are necessary and during the transfer of the information, the recording apparatus side cannot execute the other processes.

SUMMARY OF THE INVENTION

It is an object of the present invention to eliminate the foregoing drawbacks.

Another object of the invention is to improve an information memory apparatus.

Still another object of the invention is to provide an information memory apparatus which can improve the reading efficiency of information and can execute the information transfer process by a simple constitution.

Still another object of the invention is to provide an information memory apparatus which can reduce the number of memories and can efficiently transfer the information.

The above and other objects and features of the present invention will become apparent from the following detailed description and the appended claims with reference to the accompanying drawings.

DETAILED DESCRIPTION OF PREFERRED EMBODIMENTS

An embodiment of the present invention will now be described in detail hereinbelow with reference to the drawings.

Figure 1:
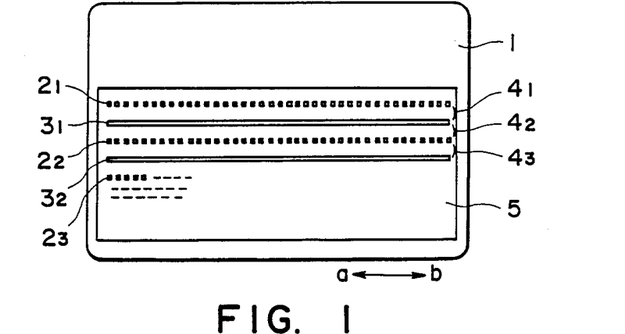
FIG. 1 is a schematic plan view of an optical card which can be applied to the present invention.

FIG. 1 is a schematic plan view of an optical card which can be applied to the present invention. In the diagram, clock tracks $2_1, 2_2, 2_3, \ldots$ and tracking tracks $3_1, 3_2, \ldots$ are alternately formed on the optical card 1 at regular intervals. Each of the clock tracks $2_1, 2_2, \ldots$ is intermittently formed like a broken line and a clock signal is recorded on the clock track. Each of the tracking tracks $3_1, 3_2, \ldots$ is continuously formed like a line. Each of recording tracks $4_1, 4_2, 4_3, \ldots$ for recording data is formed between each clock track and each tracking track.

Figure 2:
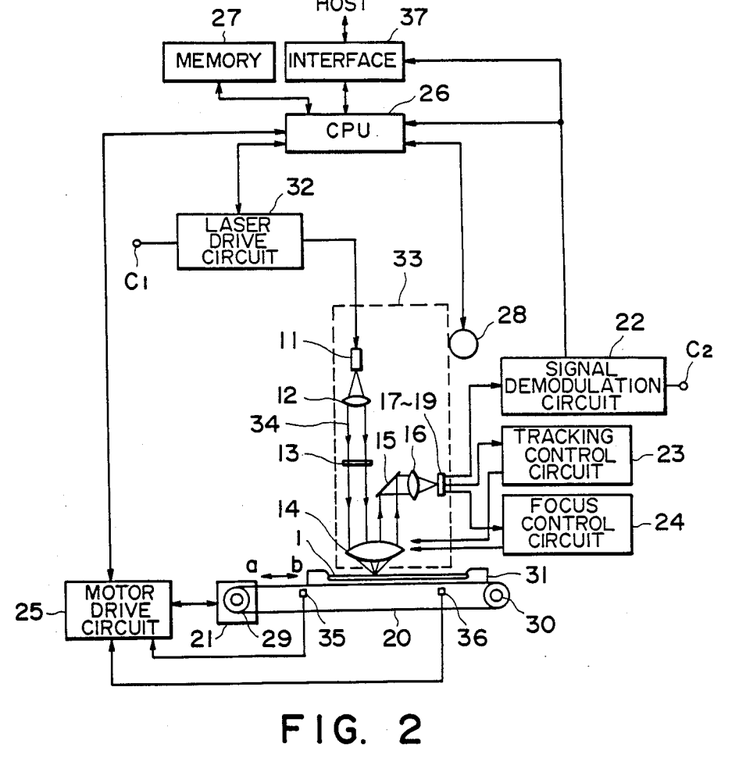
FIG. 2 is a block diagram showing the constitution of an optical card reader/writer.

FIG. 2 is a block diagram showing the constitution of an information memory apparatus in the embodiment.

The optical card 1 is placed on a card holder 31 fixed onto an endless belt 20. The belt 20 is installed between pulleys 29 and 30 and is moved in the direction indicated by an arrow a or b by a motor 21. The optical card 1 is also moved in the direction of a or b in response to the movement of the belt 20.

An optical head 33 comprises a semiconductor laser 11; a collimator lens 12; a diffraction grating 13; an objective lens 14; a reflection mirror 15; an objective lens 16; and photo-detectors 17 to 19.

The signals detected by the photo-detectors 17 to 19 are sent to a signal demodulation circuit 22, a tracking control circuit 23, and a focus control circuit 24. The focus control circuit 24 and tracking control circuit 23 move the objective lens 14 in the direction of an optical axis of the lens 14 and a direction perpendicular to the optical axis, thereby executing the auto-focusing (AF) and auto-tracking (AT).

A stepping motor 28 moves the optical head 33 in a direction perpendicular to the surface of drawing paper, thereby moving the irradiating position of an optical beam and performing an operation to access seek) the track. The motor 21 is controlled by a motor drive circuit 25 and moves and stops the optical card. Sensors 35 and 36 for detecting the reverse position of the card holder 31 are constituted by microswitches, photointerrupters, or the like. When the card holder 31 is detected by the reverse sensors 35 and 36, detection signals are sent to the motor drive circuit 25 and a CPU 26 allows the motor 21 to rotate in reverse. Numeral 27 denotes a memory and 37 is an interface for controlling the input and output of signals with a host computer side (not shown).

Figure 3:
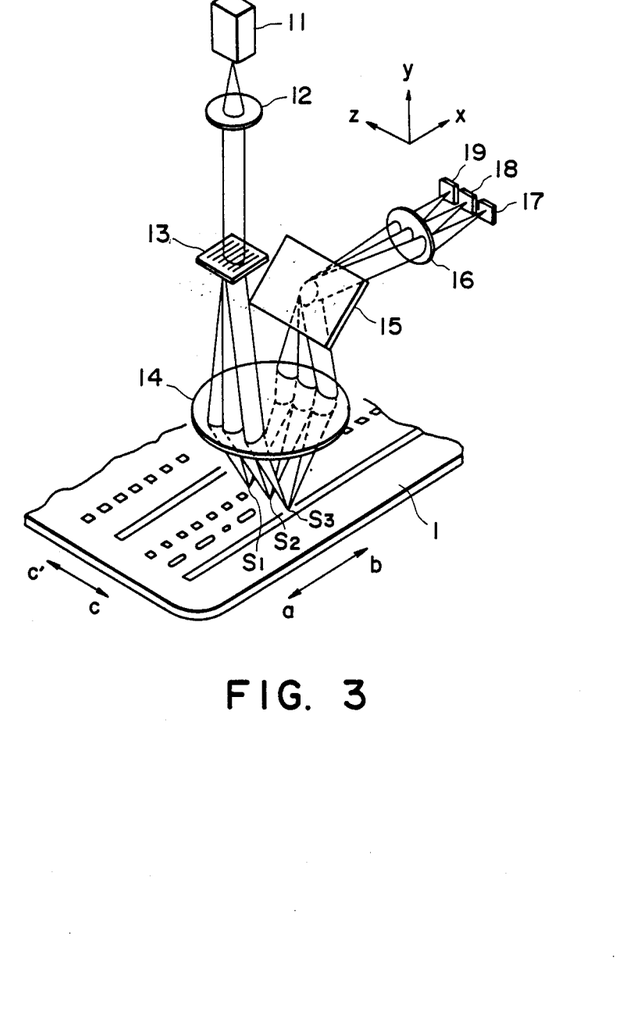
FIG. 3 is a perspective view showing a constitution of a part of the optical card reader/writer.

FIG. 3 is a perspective view showing a part of the constitution of a data recording/reproducing apparatus embodying the present invention. A beam emitted from the light source 11 such as semiconductor laser or the like is converted into a parallel beam by the collimator lens 12 and divided into three beams by the diffraction grating 13. These beams are formed as images onto the optical card 1 through the objective lens 14, so that beam spots $S_1$, $S_2$, and $S_3$ are formed, respectively. The optical card 1 is moved in the direction of the arrow a or b by the drive means 25 and scanned by the beam spots in the longitudinal directions of the tracking tracks and clock tracks.

The reflected light of the beam spots $S_1$ to $S_3$ pass through the objective lens 14 again and are reflected by the mirror 15 and projected through a condenser lens 16 onto the photo-detectors 17 to 19 disposed on the focal plane, respectively. These photo-detectors are arranged in the z direction shown in FIG. 3. The whole optical system is moved in the directions of arrows c and c' by the stepping motor 28.

Figure 4:
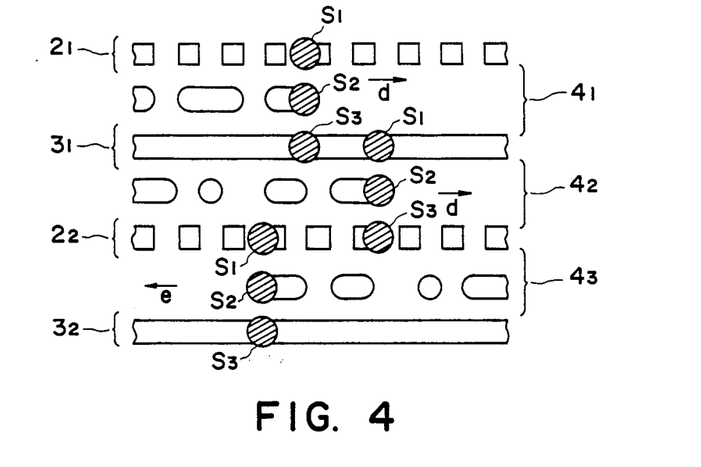
FIG. 4 is an enlarged diagram of the recording surface of the optical card for explaining the operation to record data.

FIG. 4 is an enlarged diagram of the recording surface of the optical card for explaining the operation to record data by use of the apparatus of FIG. 3. First, in the case of recording data onto the recording track $4_1$, the spots $S_1$ to $S_3$ are irradiated onto the clock track $2_1$, recording track $4_1$, and tracking track $3_1$, respectively. These spots are scanned in the direction of an arrow d when the optical card 1 is moved in the direction of a as mentioned above. The reflected light from the spot $S_1$ enters the photo-detector 17, so that the clock signal is reproduced. The reflected light from the spot $S_3$ enters the photo-detector 19 and the tracking signal is detected by a well-known method called a push-pull method or the like. The data is recorded in the direction of d by the spot $S_2$. When the optical card is returned in the direction of an arrow e, the recorded data is read out and verified to see if an error is detected or not. The data is also similarly recorded onto the other recording tracks.

Figure 5:
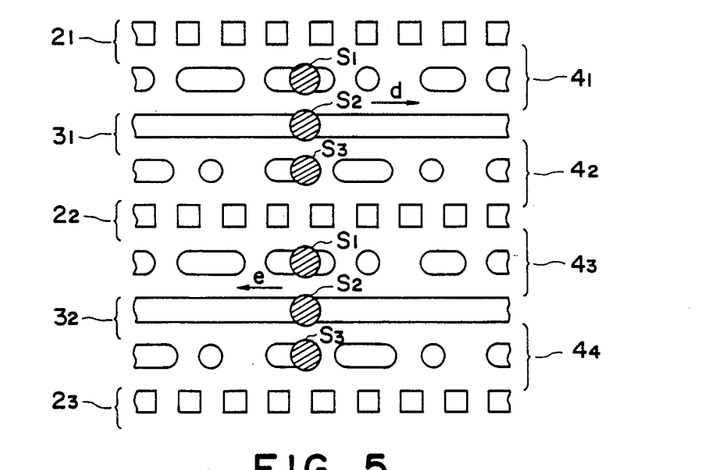
FIG. 5 is an enlarged diagram of the recording surface of the optical card for explaining an operation to reproduce the data.

FIG. 5 shows the operation when the data recorded as mentioned above is reproduced by the same apparatus.

The spots $S_1$ to $S_3$ are irradiated onto the recording track $4_1$, tracking track $3_1$, and recording track $4_2$ and scan onto the optical card 1 in the direction of the arrow d when the optical card is moved in the direction of a, respectively. While the tracking signal is detected by the photo-detector 18 corresponding to the spot $S_2$, the data recorded on the recording tracks $4_1$ and $4_2$ are simultaneously reproduced on a two-line unit basis by the photo-detectors 17 and 19 corresponding to the spots $S_1$ and $S_3$. Next, the spots $S_1$ to $S_3$ are irradiated onto the recording track $4_3$, tracking track $3_2$, and recording track $4_4$ and the optical card is moved in the direction of b and the respective spots are scanned in the direction of e. While the tracking signal is detected by the photo-detector 18, the data recorded on the recording tracks $4_3$ and $4_4$ is simultaneously reproduced by the photo-detectors 17 and 19. By repeating the foregoing operations, data recorded as a plurality of lines can be read out at a high speed on a two-line unit basis without skipping a part of the data.

Figure 6:
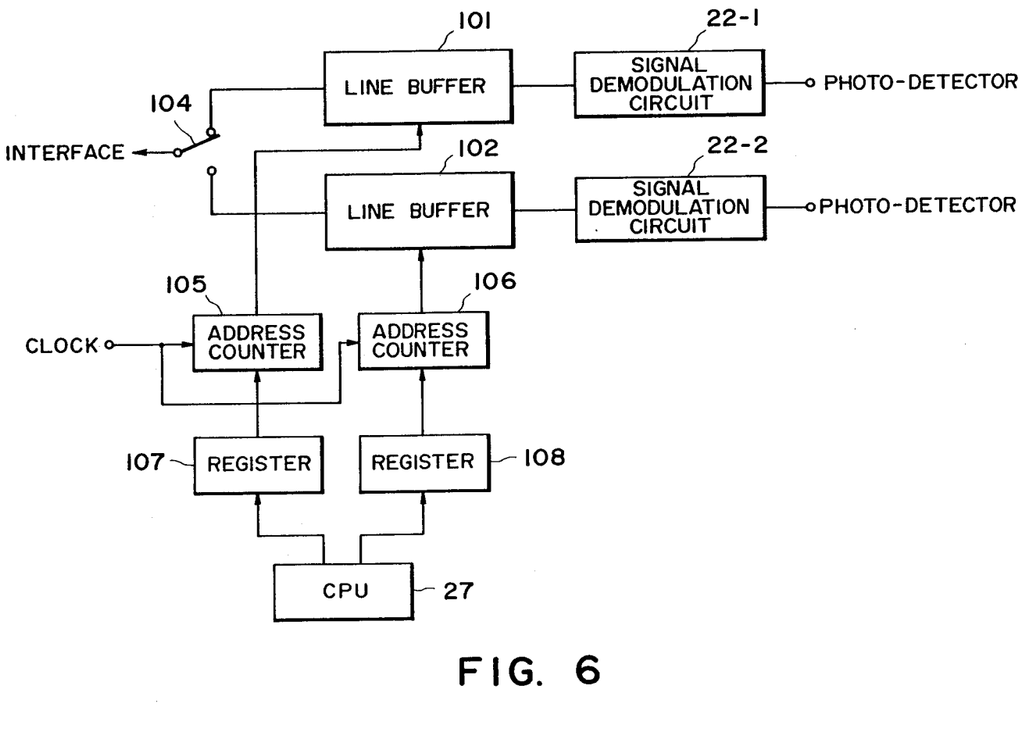
FIG. 6 is a block diagram showing a constitution to reproduce and transfer the data from the optical card.

Since the system for simultaneously reading out the data of two lines is used in this embodiment, two line buffers are prepared as shown in FIG. 6. For example, in FIG. 5, the data read out of the recording track $4_1$ is demodulated by a demodulation circuit 22-1 and stored in a line buffer 101. The data read out of the recording track $4_2$ is demodulated by a demodulation circuit 22-2 and stored in a line buffer 102. A switch 104 is sequentially switched, thereby allowing the data stored in the line buffers to be output to the interface 37. When the data is stored in the line buffers 101 and 102, the storing operations are respectively controlled by address counters 105 and 106. The address counters 105 and 106 count up and down by the clock and preset values are set by registers 107 and 108. In the case of reading the data in the direction of d, since the scanning is performed in the same direction as the writing direction, the address counter counts up. However, when the data is read out in the direction of e, since the scanning is performed in the direction opposite to the writing direction, the data is read out in the reverse direction and is also reversely stored into the line buffer. When the data is read out of the line buffer, the address counter counts down from the preset value, thereby allowing the data to be read out in the direction opposite to the storing direction in the line buffer. Thus, the data is output in accordance with the correct order. In addition to the foregoing method whereby the count value is decreased from the preset value, it is also possible to use the method whereby the increased value is held and the count value is decreased from this value.

When the data is stored in the line buffer, it is also possible to use the method whereby in the forward operation, the data is stored in the line buffer from the head address and the storage address is sequentially increased, while in the returning operation, the data is stored in the line buffer from the last address and the storage address is sequentially decreased. Therefore, when the data is read out of the line buffer, it is sufficient to always read the data from the head address.

Figure 7:
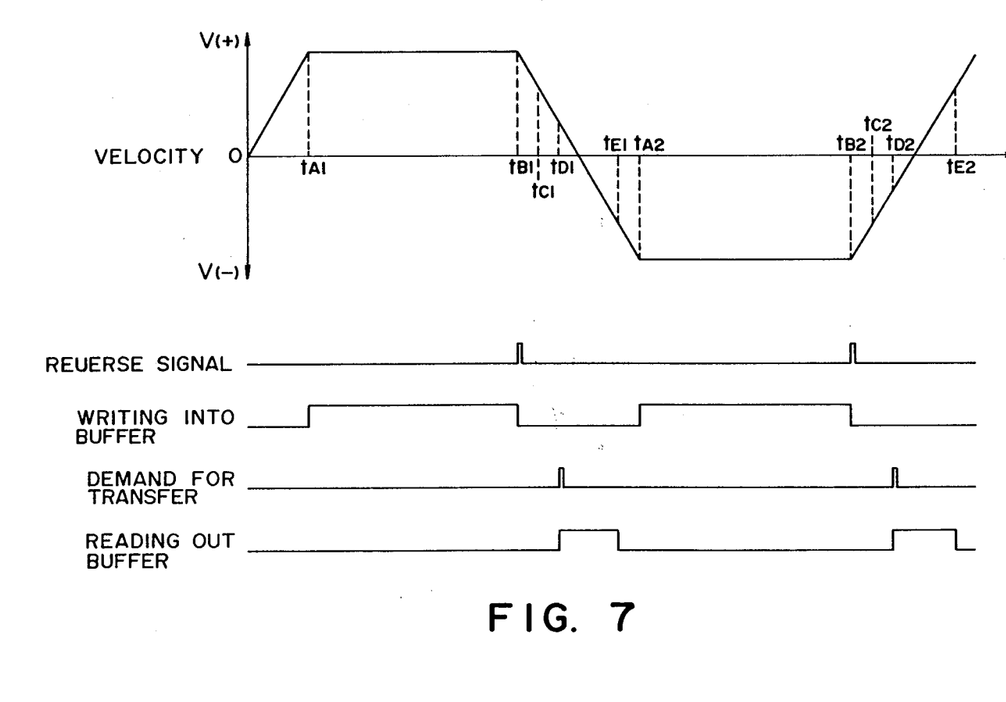
FIG. 7 is a time chart when data is reproduced.

FIG. 7 is a time chart showing the operation of the invention when the data is read out from the optical card and transferred to the host computer side.

First, a data reading command is input from the host computer side. When the moving velocity of the card becomes constant and the optical head reaches over the recording area, the data is simultaneously read out from the card on a two-track unit basis by the foregoing method. The readout data is then demodulated and sequentially stored into the buffer memories (point $t_{A1}$). At this time, the line buffers and address counters are cleared. The content of the data to be stored into the line buffers includes preamble data to perform the PLL control; a sync mark to search the beginning of the data; recording data; and postamble data to perform the PLL control when the data is read out in the opposite direction. The optical head reaches out of the recording area and the writing of the data into the buffer memories is finished (point $t_{B1}$). The content of the buffer memory is read and the sync mark is detected, thereby allowing the apparatus to be ready to soon transfer the recording data (point $t_{C1}$). In this state, the apparatus waits for a signal indicative of demand for transfer which is output from the interface. When the data transfer is requested, the recording data is read out of the buffer memory 101 and the recording data is subsequently read out of the buffer memory 102 and the direct transfer of the data into the memory on the host computer side is started (point $t_{D1}$). All of the recording data in the buffer memory is read out and the data transfer is finished (point $t_{E1}$). When the card is returned, the recording data is also transferred in a manner similar to the above when the card is moved in reverse.

Figure 8:
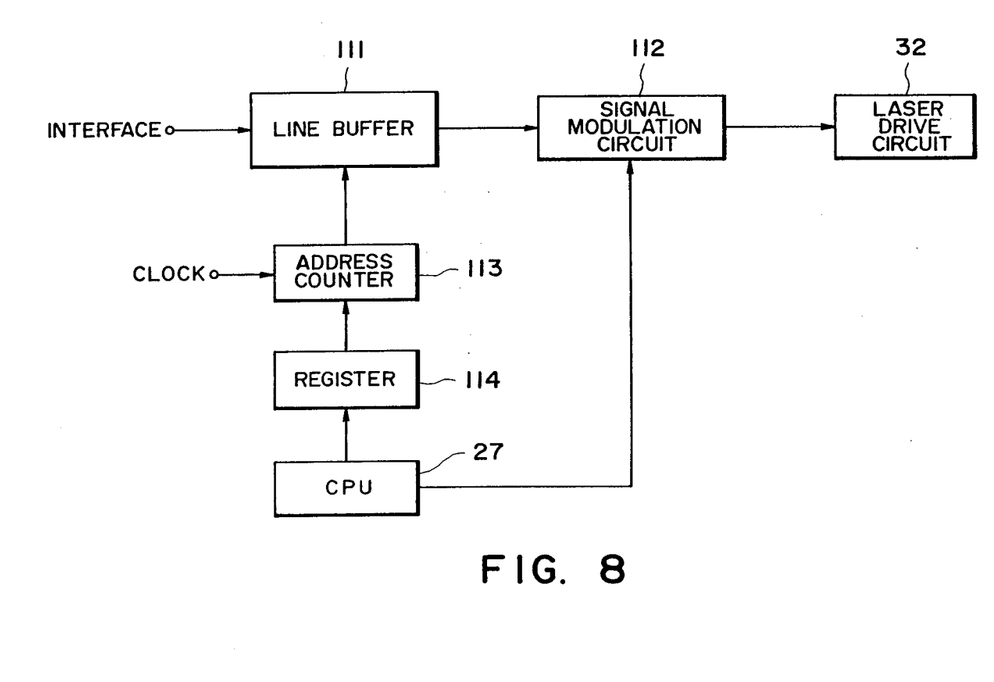
FIG. 8 is a bock diagram showing a constitution to record data onto the optical card.

FIG. 8 is a block diagram showing part of the invention when data is recorded onto the optical card and shows a detailed diagram of a part of the block diagram of FIG. 1. The recording data is sent from the host side and stored in a buffer memory 111. This data is modulated by a signal modulation circuit 112 and sent to a laser drive circuit 32 and recorded onto the card by a laser beam. Similar to the case of the reproduction mentioned above, the writing of the data into the buffer memory is controlled by the address counter.

Figure 9:
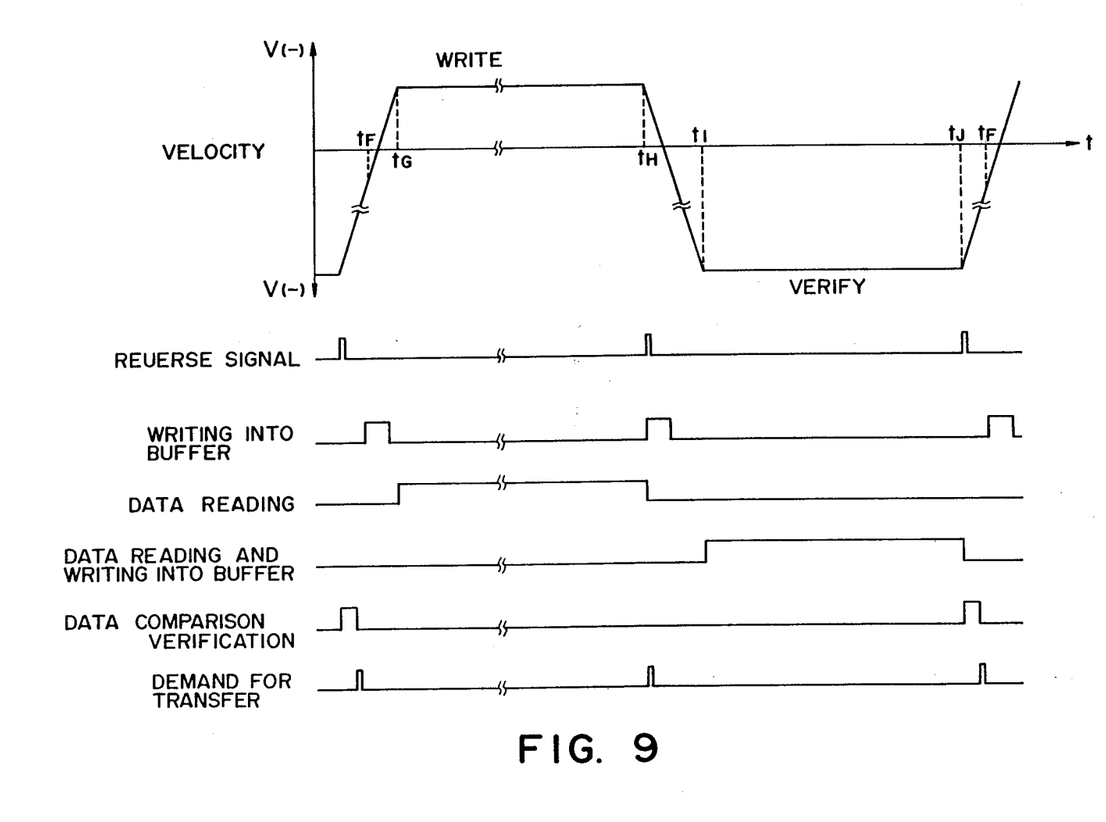
FIG. 9 is a time chart when data is recorded.

FIG. 9 is a timing chart showing the situation when data is recorded onto the optical card. First, a data transfer command is sent from the host side to the apparatus side. Subsequently, the data is transferred. The storage of this data in the buffer memory 111 is started (point $t_F$). At this time, the buffer memory and address counter are cleared. When the optical head reaches the recording area, the data is read out of the buffer memory synchronously with the recording speed and recorded onto the optical card (point $t_G$). In this case, the foregoing preamble data, sync mark, and postamble data are also recorded. After the optical head is out of the recording area and the writing of the data is finished, the same data as the data which has just been recorded is again transferred from the host side and stored in the buffer memory 111 (point $t_H$). When the optical card is returned and the optical head passes over the recording area, the data which has just been recorded onto the optical card is read out and stored into the buffer memory 101 (point $t_I$). The card feeding speed upon reading is very much higher than that upon recording. After the optical head is reached out of the recording area of the card and the reading of the data is finished, the content of the buffer memory 111 is compared with the content of the buffer memory 101. If they coincide, a signal indicative of demand for transfer is output and the data to be written onto the next track is transferred from the host side (point $t_J$). If they do not coincide, the same data is transferred again and recorded on the next track again. Since the data is written in reverse in the buffer memory 101, when the data is read out, the address counter is reduced and the data is read out in the correct direction.

Although the embodiment has been described with respect to the optical card, it can be also applied to a magnetic tape and a disc-shaped recording medium which is fed in a stepwise manner.

The present invention is not limited to the foregoing embodiment but many modifications and variations are possible within the spirit and scope of the appended claims of the invention.

WHAT IS CLAIMED IS:

1. An information memory apparatus comprising:
   moving means for reciprocating a recording medium;
   means for reading out information from the recording medium which is being moved by said moving means;
   a memory for temporarily storing the information read out by said reading means; and
   control means for making the positions to start the reading of the information stored in said memory different in accordance with the reading of the information upon going operation of said recording medium and with the reading of the information upon returning operation.

2. An information memory apparatus according to claim 1, wherein said control means makes the reading directions of the information from said memory different in accordance with the going and returning operations of said recording medium.

3. An information memory apparatus according to claim 1, further having means for transferring the information read out of said memory to the outside.

4. An information memory apparatus comprising moving means for reciprocating a recording medium;
   means for reading out information from said recording medium which is being moved by said moving means;
   a memory for temporarily storing the information read out by said reading means;
   means for designating a read address of the information stored in said memory; and
   means for controlling the read address by said designating means in accordance with whether the information stored in the memory is the information which was stored during the going operation of said recording medium or during the returning operation thereof.

5. An information memory apparatus according to claim 4, wherein said control means sequentially increases the read address for the information stored during the going operation and sequentially decreases the read address for the information stored during the returning operation.

6. An information memory apparatus according to claim 4, wherein said designating means includes a counter.

7. An information memory apparatus according to claim 6, wherein said control means presets a predetermined value into said counter and increases or decreases from said preset value.

8. An information memory apparatus according to claim 6, wherein said designating means has means for designating a storage address into said memory and when the information is stored into said memory, said storage address is sequentially increased and the value is held, and when the information is read out of the memory, said read address is set to the value which is derived by decreasing from said value held.

9. An information memory apparatus comprising
   moving means for reciprocating a recording medium;
   means for reading out information from said recording medium which is being moved by said moving means;
   a memory for temporarily storing the information read out by said reading means;
   means for designating a storage address of the information to be stored into said memory; and
   means for controlling the storage address by said designating means in accordance with whether the information to be stored into the memory is the information to be stored during the going operation of said recording medium or the information to be stored during the returning operation.

10. An information memory apparatus according to claim 9, wherein said control means sequentially increases said storage address for the information to be stored during the going operation and sequentially decreases the storage address for the information to be stored during the returning operation.

11. An information memory apparatus according to claim 9, wherein said designating means includes a counter.

12. An information memory apparatus comprising:
    moving means for reciprocating a recording medium at a constant speed;
    means for reading out information from the recording medium which is being moved at a constant speed by said moving means;

a memory for temporarily storing the information read out by said reading means while the recording medium is being moved at a constant speed; and control means for allowing the information stored in said memory to be output while the moving direction of the recording medium is reversed.

13. An information memory apparatus according to claim 12, wherein said recording medium is moved at a constant velocity while the information is being read out of said recording medium, and the recording medium is decelerated or accelerated while the information is being output from said memory.

14. An information memory apparatus according to claim 12, wherein said recording medium is a card-shaped recording medium.

15. An information memory apparatus comprising:

moving means for reciprocating a recording medium;

a memory for temporarily storing information to be recorded onto the recording medium;

means for recording the information onto the recording medium while the information stored in said memory i being read out, when the recording medium is being moved at a constant speed; and control means for allowing the information to be stored in said memory while the moving direction of the recording medium is reversed.

16. An information memory apparatus according to claim 15, wherein said recording medium is moved at a constant velocity while the information is being recorded onto said recording medium, and the recording medium is deceleerated or accelerated while the information is being stored into said memory.

17. An information memory apparatus according to claim 15, wherein said recording medium is a card-shaped recording medium.

18. An information memory apparatus according to claim 12, further comprising receiving means for receiving a request signal for requesting that the information read out from the recording medium be transferred, wherein the control means causes the information stored in said memory to be outputted when said receiving means receives the request signal.

19. An information memory apparatus according to claim 12, wherein the recording medium includes a plurality of information recording tracks, and wherein said memory stores information track-by-track.

20. An information memory apparatus according to claim 15, wherein the recording medium includes a plurality of information recording tracks, and wherein said memory stores information track-by-track.

21. An information memory apparatus according to claim 15, further comprising output means for outputting a request signal for requesting that the information be stored in said memory, when the recording medium is being moved at a non-constant speed.

22. An information memory apparatus according to claim 12, wherein said reading means does not read out information while the recording medium is being reversed.

23. An information memory apparatus according to claim 12, further comprising detecting means for detecting the position at which the recording medium reverses direction, wherein said moving means starts an operation for reversing the direction of motion of the recording medium when the recording medium reaches the reverse position.

24. An information memory apparatus according to claim 15, wherein the recording means does not record information while the recording medium is being reversed.

25. An information memory apparatus according to claim 15, further comprising detecting means for detecting the position at which the recording medium is reversed, wherein said moving means starts an operation for reversing the direction of motion of the recording medium when the recording medium reaches the reverse position.

* * * * *